(12) United States Patent
Wu (10) Patent No.: US 9,678,352 B2
(45) Date of Patent: Jun. 13, 2017

(54) LIQUID CRYSTAL GRATING AND DISPLAY DEVICE

(71) Applicant: BOE TECHNOLOGY GROUP CO., LTD., Beijing (CN)

(72) Inventor: Kun Wu, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 12 days.

(21) Appl. No.: 14/435,012

(22) PCT Filed: Aug. 13, 2014

(86) PCT No.: PCT/CN2014/084283
§ 371 (c)(1),
(2) Date: Apr. 10, 2015

(87) PCT Pub. No.: WO2015/165170
PCT Pub. Date: Nov. 5, 2015

(65) Prior Publication Data
US 2016/0139418 A1 May 19, 2016

(30) Foreign Application Priority Data

Apr. 30, 2014 (CN) .......................... 2014 1 0181496

(51) Int. Cl.
| | | |
|---|---|---|
| G02F 1/1335 | (2006.01) | |
| G02B 27/22 | (2006.01) | |
| G02F 1/1343 | (2006.01) | |

(52) U.S. Cl.
CPC ......... *G02B 27/225* (2013.01); *G02F 1/1343* (2013.01); *G02F 1/13439* (2013.01); *G02F 1/134336* (2013.01)

(58) Field of Classification Search
CPC ..... G02B 27/225; G02B 27/22; G02F 1/1343; G02F 1/134336; G02F 1/13439
See application file for complete search history.

(56) References Cited

U.S. PATENT DOCUMENTS

2008/0218459 A1 9/2008 Kim et al.
2013/0127831 A1 5/2013 Kim et al.

FOREIGN PATENT DOCUMENTS

| CN | 101957523 | 1/2011 |
| CN | 102469339 | 5/2012 |

(Continued)

OTHER PUBLICATIONS

First Office Action issued in corresponding Chinese Application No. 2014101814967 dated Jan. 23, 2015.

(Continued)

*Primary Examiner* — Nathanael R Briggs
(74) *Attorney, Agent, or Firm* — Brooks Kushman P.C.

(57) ABSTRACT

The liquid crystal grating includes a first substrate and a second substrate arranged opposite to each other, and a liquid crystal layer arranged therebetween. The liquid crystal grating further includes: a plurality of first electrodes having a first extension direction and arranged parallel to each other and on the first substrate; and a plurality of second electrodes having a second extension direction and arranged parallel to each other and on the second substrate. The first electrodes and the second electrodes cross each other and are configured to enable, under control of a first driving signal, the liquid crystal layer to form a first grating for the 3D display together with the display panel in a first direction, and to enable, under control of a second driving signal, the liquid crystal layer to form a second grating for the 3D display together with the display panel in a second direction.

20 Claims, 7 Drawing Sheets

(56) References Cited

FOREIGN PATENT DOCUMENTS

| | | | |
|---|---|---|---|
| CN | 102540590 | | 7/2012 |
| CN | 102914892 | | 2/2013 |
| CN | 202975543 | | 6/2013 |
| CN | 103676346 | | 3/2014 |
| JP | 2011145697 | | 7/2011 |
| JP | 2011145697 A | * | 7/2011 |
| KR | 20130051819 | | 5/2013 |

OTHER PUBLICATIONS

International Search Report and Written Opinion issued in corresponding International Application No. PCT/CN2014/084283 dated Jan. 26, 2015.

Office Action in Chinese Patent Application No. 201410181496.7, dated Sep. 28, 2015.

* cited by examiner

LIQUID CRYSTAL GRATING AND DISPLAY DEVICE

CROSS-REFERENCE TO RELATED APPLICATIONS

The present application is the U.S. National Phase of International Patent Application No. PCT/CN2014/084283, filed Aug. 13, 2014 which claims a priority to Chinese patent application No. 201410181496.7, filed Apr. 30, 2014, which is incorporated herein by reference in their entirety.

TECHNICAL FIELD

The present disclosure relates to the field of display technology, in particular to a liquid crystal grating and a display device.

BACKGROUND

Along with the rapid development of the three-dimensional (3D) display technology, the demand for a 3D display device is growing. Among various technologies for 3D display, an autostereoscopic display technology has attracted more and more attentions because it is unnecessary for a viewer to use spectacles.

Currently, as a primary mode for the autostereoscopic display technology, a grating is arranged in front of a display panel, and a pixel units of the display panel are divided into pixels in odd-numbered rows and pixels in even-numbered rows in a horizontal direction. As a result, it is able to provide a left eye and a right eye of the viewer with different images and generate depth information on the basis of a parallax effect between a left-eye image and a right-eye image of the viewer, thereby to provide a stereo display effect.

Figure 1:
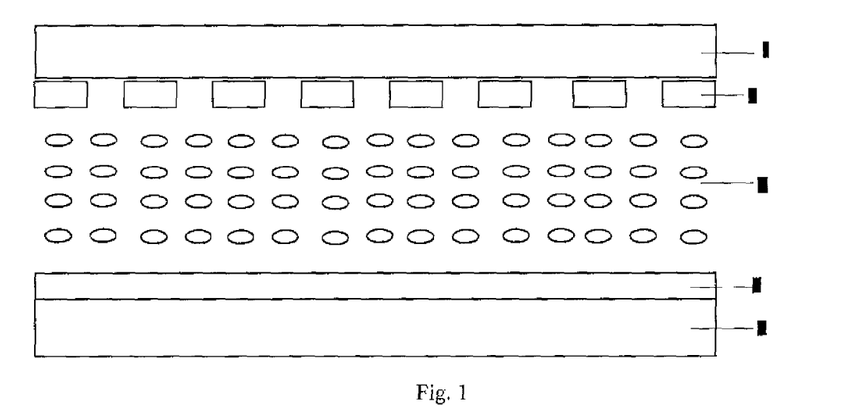
FIG. 1 is a schematic view showing a first state of an existing liquid crystal grating.
Figure 2:
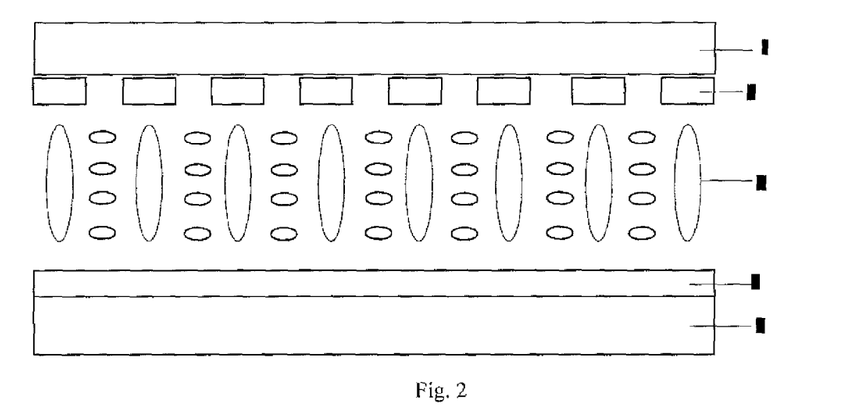
FIG. 2 is a schematic view showing a second state of the existing liquid crystal grating.

As shown in FIGS. 1 and 2, an existing liquid crystal grating includes a first substrate 1 and a second substrate 2 arranged opposite to each other, and a first electrode 3, a liquid crystal layer 4 and a second electrode 5 arranged sequentially between the first substrate 1 and the second substrate 2. The first electrode 3 consists of a plurality of bar-like electrodes arranged in an array form, and the second electrode 5 is a planar electrode. Liquid crystal molecules in the liquid crystal layer 4 are deflected due to a voltage difference between the first electrode 3 and the second electrode 5, so as to form a specific arrangement mode for the liquid crystal molecules.

When the voltage difference between the first electrode 3 and the second electrode 5 is less than a threshold value, as shown in FIG. 1, the liquid crystal molecules in the liquid crystal layer 4 are in an initial state where they are not deflected, and light beams from the display panel can pass through the liquid crystal grating, so as to achieve the 2D display. When the voltage difference between the first electrode 3 and the second electrode 5 is greater than the threshold value, as shown in FIG. 2, the liquid crystal molecules at a region corresponding to the first electrode 3 are deflected to be in an upright state where the light beams from the display panel cannot pass therethrough, while the liquid crystal molecules at a position other than the region corresponding to the first electrode 3 are not deflected and the light beams from the display panel can pass therethrough. As a result, it is able to deflect the light beams for the left-eye image and the right-eye image toward the viewer's left eye and right eye, respectively, thereby to achieve the 3D display.

When a 3D image is viewed by the viewer in both a landscape orientation and a portrait orientation, slits of the grating are required to be located at variable positions. However, in the existing liquid crystal grating, the slits are located at fixed positions, and the 3D image can merely be viewed in one orientation. Hence, there is an urgent need in the art to develop a liquid crystal grating with adjustable slit positions, so as to enable the viewer to view the 3D image in both the landscape orientation and the portrait orientation.

SUMMARY

An object of the present disclosure is to provide a liquid crystal grating and a display device, so as to make a slit position adjustable, thereby to enable a viewer to view a 3D image in both a landscape orientation and a portrait orientation.

In one aspect, the present disclosure provides in one embodiment a liquid crystal grating for 3D display together with a display panel. The liquid crystal grating includes a first substrate and a second substrate arranged opposite to each other, and a liquid crystal layer arranged between the first substrate and the second substrate. The liquid crystal grating further includes:

a plurality of first electrodes having a first extension direction and arranged parallel to each other, the first electrodes being arranged on the first substrate; and a plurality of second electrodes having a second extension direction and arranged parallel to each other, the second electrodes being arranged on the second substrate, wherein the first electrodes and the second electrodes cross each other; and the first electrodes and the second electrodes are configured to enable, under the control of a first driving signal, the liquid crystal layer to form a first grating for the 3D display together with the display panel in a first direction, and to enable, under the control of a second driving signal, the liquid crystal layer to form a second grating for the 3D display together with the display panel in a second direction.

Alternatively, a light-shielding region of the first grating is located at a position corresponding to a boundary between two adjacent subpixel units of the display panel in different colors, and a light-shielding region of the second grating is located at a position corresponding to a boundary between two adjacent subpixel units of the display panel in an identical color.

Alternatively, the first driving signal and the second driving signal are used to, when a voltage difference between a first number of the adjacent first electrodes and a second number of the adjacent second electrodes is greater than a predetermined value, enable the light-shielding region to be formed at a region where the first number of the adjacent first electrodes and the second number of the adjacent second electrodes are directly opposite to each other and cross each other, and when the voltage difference is less than the predetermined value, enable a light-transmitting region to be formed at the region where the first number of the adjacent first electrodes and the second number of the adjacent second electrodes are directly opposite to each other and cross each other.

Alternatively, in the first grating and the second grating, the light-shielding region is of a size equal to the light-transmitting region, and the light-shielding region of the first grating is of a size equal to the light-shielding region of the second grating.

Alternatively, the first number and the second number are each two, the two adjacent first electrodes are spaced apart from each other at a first interval, and a sum of the first interval and a width of the first electrode is one half of a width of the subpixel unit of the display panel in the second extension direction. The two adjacent second electrodes are spaced apart from each other at a second interval, and a sum of the second interval and a width of the second electrode is one half of a width of the subpixel unit of the display panel in the first extension direction.

Alternatively, a plurality of first electrode control unit sets is arranged sequentially on the first substrate, and each first electrode control unit set includes four adjacent first electrodes. A plurality of second electrode control unit sets is arranged sequentially on the second substrate, and each second electrode control unit set includes four adjacent second electrodes.

Alternatively, in accordance with the first driving signal, in the first electrode control unit set, a first one and a second one of the first electrodes receive a first voltage, a third one and a fourth one of the first electrodes receive a second voltage, and in the second electrode control unit set, a first one and a second one of the second electrodes receive the first voltage, and the third one and the fourth one of the second electrodes receive the second voltage. In accordance with the second driving signal, in the first electrode control unit set, the second one and the third one of the first electrodes receive the first voltage, the first one and the fourth one of the first electrodes receive the second voltage, and in the second electrode control unit set, the second one and the third one of the second electrodes receive the first voltage, and the first one and the fourth one of the second electrodes receive the second voltage.

Alternatively, a difference between the first voltage and the second voltage is greater than 3V.

Alternatively, the second voltage is 0V.

Alternatively, the first extension direction is perpendicular to the second extension direction.

Alternatively, the first extension direction is a direction parallel to a first edge of the display panel, and the second extension direction is a direction parallel to a second edge of the display panel.

Alternatively, the first substrate and the second substrate are each a transparent substrate.

Alternatively, the first electrode and the second electrode are bar-like electrodes.

In another aspect, the present disclosure provides in one embodiment a display device including a display panel and the above-mentioned liquid crystal grating.

According to the embodiments of the present disclosure, the first electrodes and the second electrodes at both sides of the liquid crystal layer are all bar-like electrodes and cross each other, and a plurality of regions where the first electrodes and the second electrodes are directly opposite to each other and cross each other are formed. Liquid crystal molecules in the liquid crystal layer at each region are controlled to be opaque or nonopaque in accordance with the voltage difference between the first electrode and the second electrode corresponding to this region. When different driving signals are inputted to the first electrode and the second electrode, different gratings are formed. As a result, it is able to adjust a slit position, thereby to enable a viewer to view a 3D image in both a landscape orientation and a portrait orientation.

DETAILED DESCRIPTION

In order to make the objects, the technical solutions and the advantages of the present disclosure more apparent, the present disclosure will be described hereinafter in conjunction with the drawings and the embodiments.

The present disclosure provides in one embodiment a liquid crystal grating for 3D display together with a display panel. The liquid crystal grating includes a first substrate and a second substrate arranged opposite to each other, and a liquid crystal layer arranged between the first substrate and the second substrate. The liquid crystal grating further includes:

a plurality of first electrodes having a first extension direction and arranged parallel to each other, the first electrodes being arranged on the first substrate; and a plurality of second electrodes having a second extension direction and arranged parallel to each other, the second electrodes being arranged on the second substrate, wherein the first electrodes and the second electrodes cross each other; and the first electrodes and the second electrodes are configured to enable, under the control of a first driving signal, the liquid crystal layer to form a first grating for the 3D display together with the display panel in a first direction, and to enable, under the control of a second driving signal, the liquid crystal layer to form a second grating for the 3D display together with the display panel in a second direction.

According to the liquid crystal grating in an embodiment of the present disclosure, the first electrodes and the second electrodes at both sides of the liquid crystal layer are all bar-like electrodes and cross each other, and a plurality of regions where the first electrodes and the second electrodes are opposite to each other and cross each other are formed. When the driving signal is inputted to each bar-like electrode separately, liquid crystal molecules in the liquid crystal layer at each region are controlled to be opaque or nonopaque in accordance with a voltage difference between the first electrode and the second electrode corresponding to this region. When different driving signals are inputted to the first electrode and the second electrode, different gratings are formed. As a result, it is able to adjust a slit position, thereby to enable a viewer to view a 3D image in both a landscape orientation and a portrait orientation.

Alternatively, the first extension direction is perpendicular to the second extension direction, the first extension is a direction parallel to a first edge of the display panel, and the second extension is a direction parallel to a second edge of the display panel.

In addition, it should be appreciated that, the first substrate and the second substrate are each a transparent substrate.

Figure 3:
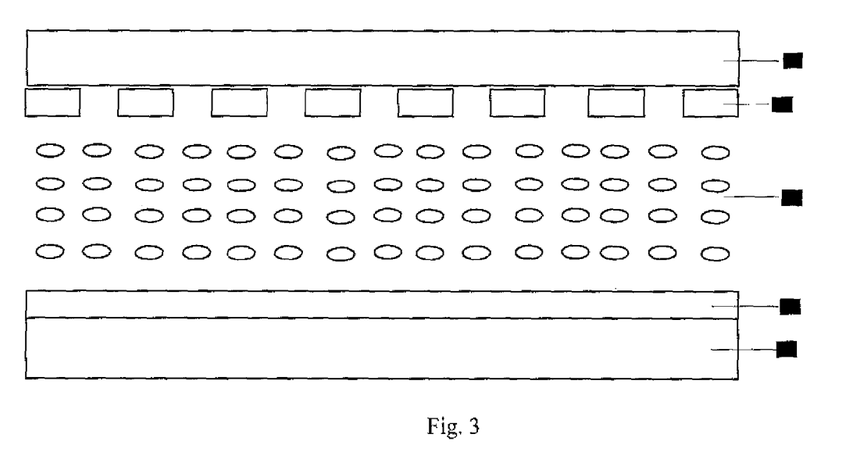
FIG. 3 is a sectional view of a liquid crystal grating according to one embodiment of the present disclosure.
Figure 4:
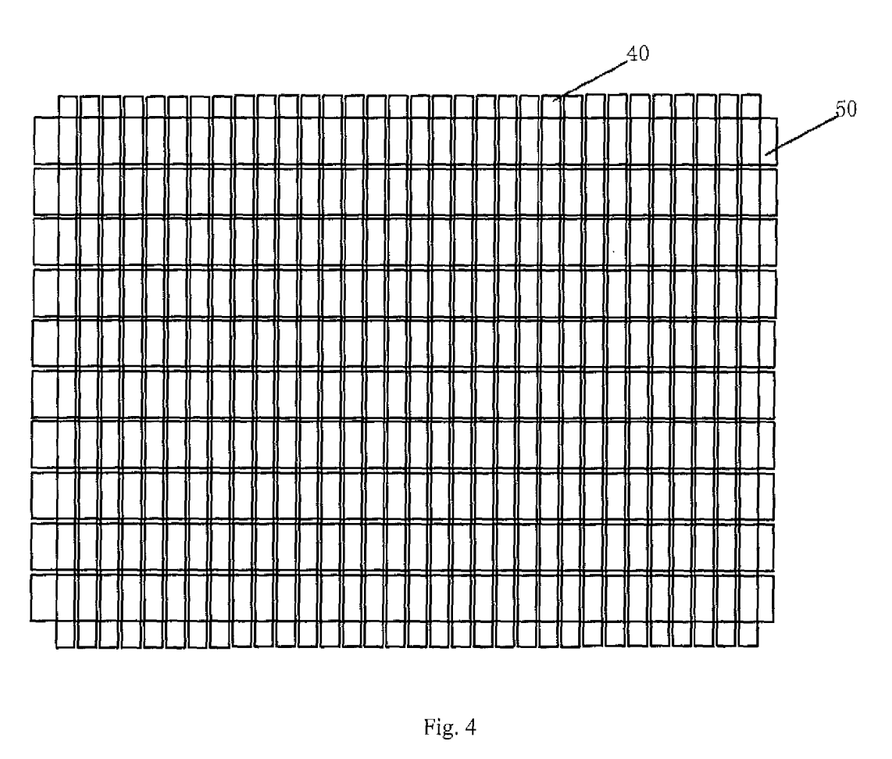
FIG. 4 is a schematic view showing the structural relationship between a first electrode and a second electrode in the liquid crystal grating according to one embodiment of the present disclosure.

Referring to FIG. 3, which is a sectional view of the liquid crystal grating according to one embodiment of the present disclosure, and FIG. 4, which is a schematic view showing the structural relationship between the first electrode and the second electrode in the liquid crystal grating according to one embodiment of the present disclosure, the liquid crystal grating includes a first substrate 10, a second substrate 20, and a liquid crystal layer 30 arranged between the first substrate 10 and the second substrate 20. A first electrode 40 is arranged at a side of the first substrate 10 facing the liquid crystal layer 30, and a second electrode 50 is arranged at a side of the second substrate 20 facing the liquid crystal layer 30.

To be specific, there is a plurality of first electrodes 40 which are arranged vertically on the first substrate 10 and parallel to each other, and there is a plurality of second electrodes 50 which are arranged horizontally on the second substrate 20 and parallel to each other.

According to the liquid crystal grating in this embodiment, the first electrodes 40 and the second electrodes 50 may be used to control the liquid crystal layer 30 in accordance with different driving signals, so as to form different grating structures. At this time, the display panel may display a 3D image in both a portrait orientation (a first direction) and a landscape orientation (a second direction).

Figure 5:
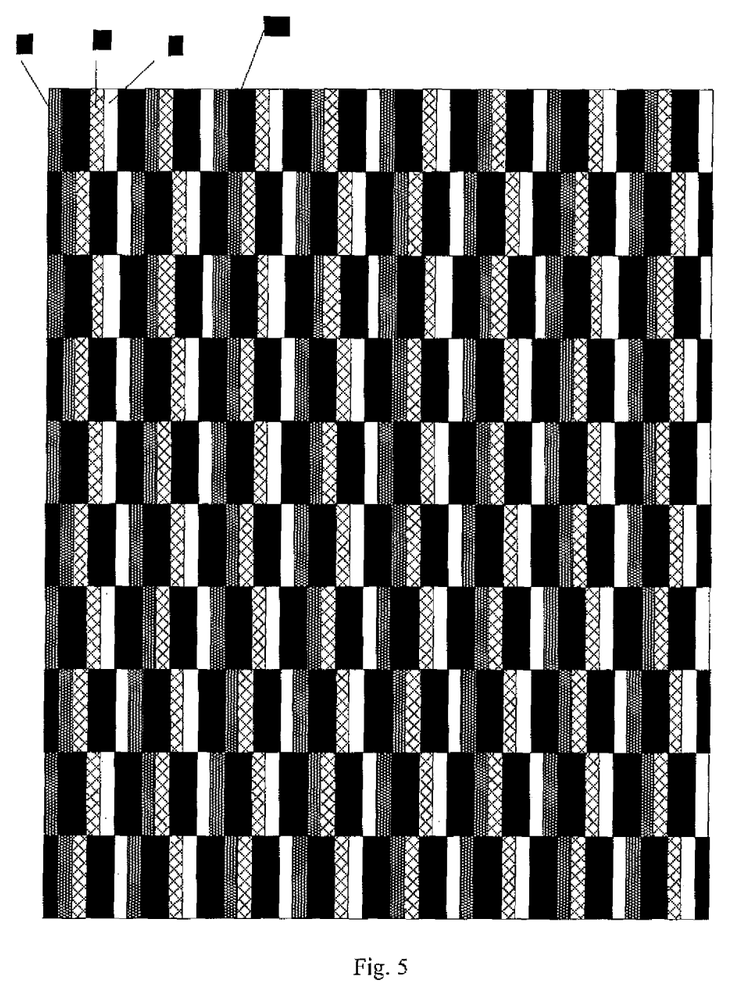
FIG. 5 is a schematic view showing the structural relationship between a pixel unit and a grating when a 3D image is displayed in a portrait orientation.
Figure 6:
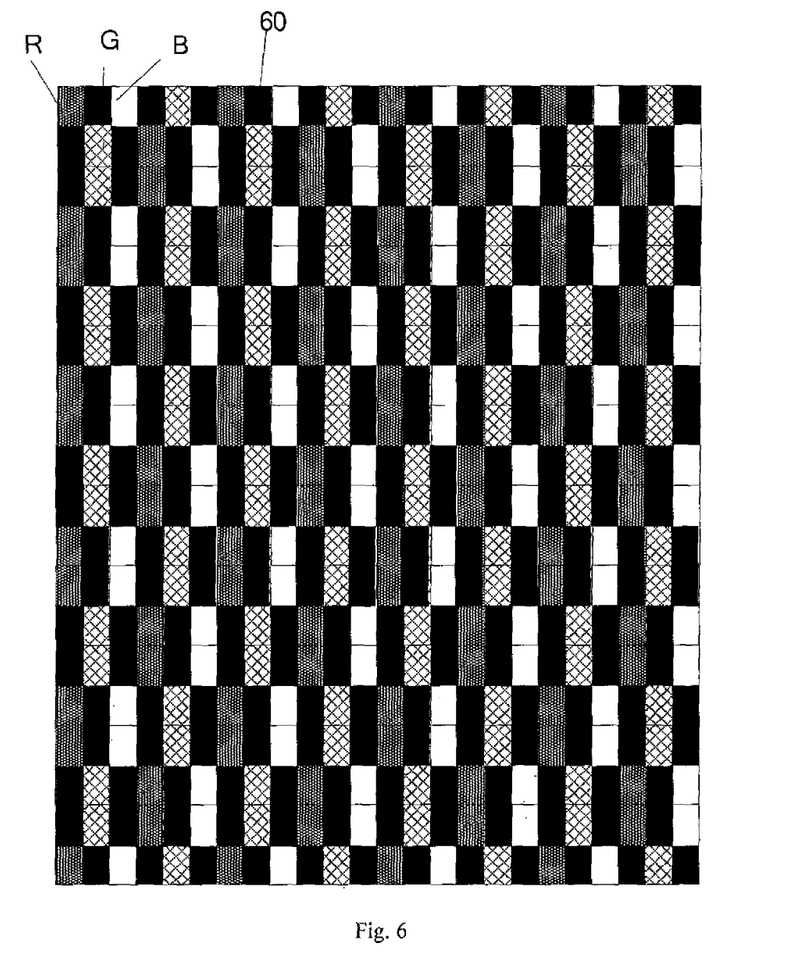
FIG. 6 is a schematic view showing the structural relationship between the pixel unit and the grating when the 3D image is displayed in a landscape orientation.

FIGS. 5 and 6 are schematic views showing the structural relationship between a pixel unit and the grating when the display panel displays the 3D image in the portrait orientation and the landscape orientation, respectively.

It should be appreciated that the display panel usually includes a plurality of pixel units, and each pixel unit includes at least three subpixel units, e.g., red, blue and green subpixel units, or red, blue, green and white subpixel units, or red, blue, green and yellow subpixel units. These pixel units are arranged sequentially on the display panel. When the pixel unit includes three subpixel units and these subpixel units (in different colors) are arranged in a row direction, as shown in FIGS. 5 and 6, usually the subpixel units in an identical color are included in one column, i.e., the subpixel units in an identical color are arranged in a column direction. Identically, when three subpixel units (in different colors) are arranged in the column direction, usually the subpixel units in an identical color are arranged in one row, i.e., the subpixel units in an identical color are arranged in the row direction. Based on the above, when the pixel unit includes four subpixel units, the arrangement mode of the subpixel units is known to a person skilled in the art and thus will not be repeated herein. The structure of the liquid crystal grating in the embodiments of the present disclosure will be described hereinafter by taking the pixel unit including three subpixel units as an example. Of course, the pixel unit may also include four or more subpixel units.

Figure 7:
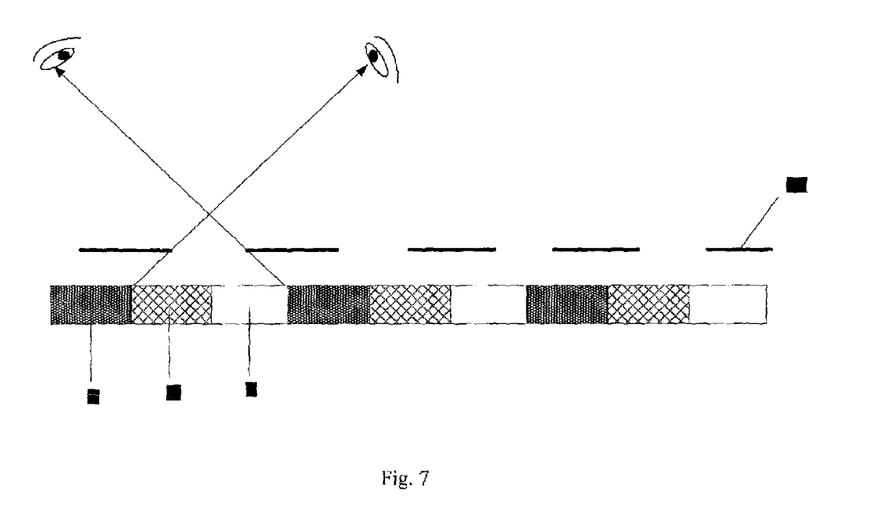
FIG. 7 is a schematic view showing the structural relationship among eyes, the pixel unit and the grating when the 3D image is displayed in the portrait orientation.
Figure 8:
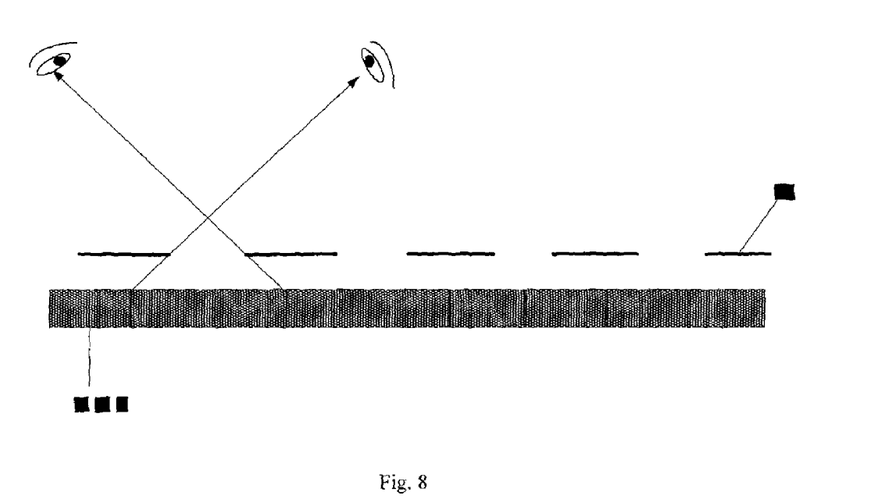
FIG. 8 is a schematic view showing the structural relationship among the eyes, the pixel unit and the grating when the 3D image is displayed in the landscape orientation.

Referring to FIGS. 5 and 7, when a user views a 3D image in the portrait orientation, the subpixel units in different colors are arranged in a direction parallel to a straight line connecting left and right eyes of the user. At this time, the relationship between a first grating and the pixel unit is shown in FIG. 5, and a light-shielding region 60 of the first grating is located at a position corresponding to a boundary between the adjacent subpixel units in different colors in the display panel. Referring to FIGS. 6 and 8, when the user views the 3D image in the landscape orientation, the subpixel units in an identical color are arranged in a direction parallel to the straight line connecting the left and right eyes of the user. At this time, the relationship between a second grating and the pixel unit is shown in FIG. 6, and a light-shielding region 60 of the second grating is located at a position corresponding to a boundary between the adjacent subpixel units in an identical color in the display panel. A region between two adjacent light-shielding regions 60 is just a light-transmitting region of the liquid crystal grating.

It should be appreciated that, an aperture ratio=an area of the light-transmitting region/(the area of the light-transmitting region+an area of the light-shielding region)*100%. Comparing FIG. 5 with FIG. 6, when an aperture ratio of the first grating in the portrait orientation is A % and an aperture ratio of the second grating in the landscape orientation is B %, the light-shielding region of the second grating is moved horizontally to the left or right by A % and moved vertically up or down by B %, relative to the light-shielding region of the first grating. Hence, when the aperture ratios of the first grating and the second grating are both 50%, the second grating is moved horizontally to the left or right by 50% and moved vertically up or down by 50%, relative to the first grating.

Figure 9:
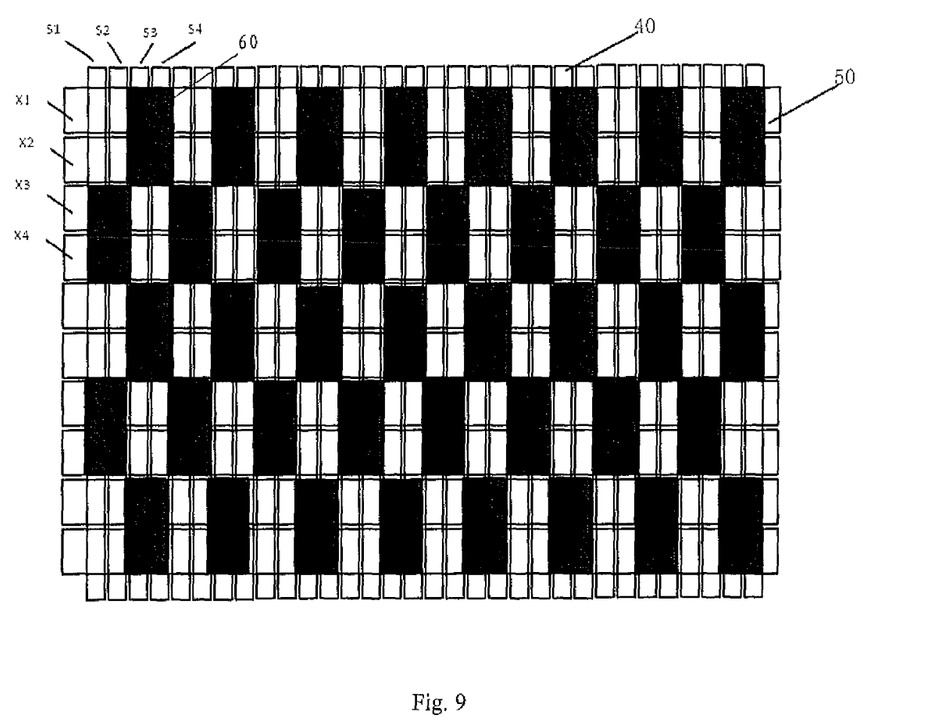
FIG. 9 is a schematic view showing the structural relationship between the electrodes and a light-shielding region of the formed grating when the 3D image is viewed in the portrait orientation according to one embodiment of the present disclosure.
Figure 10:
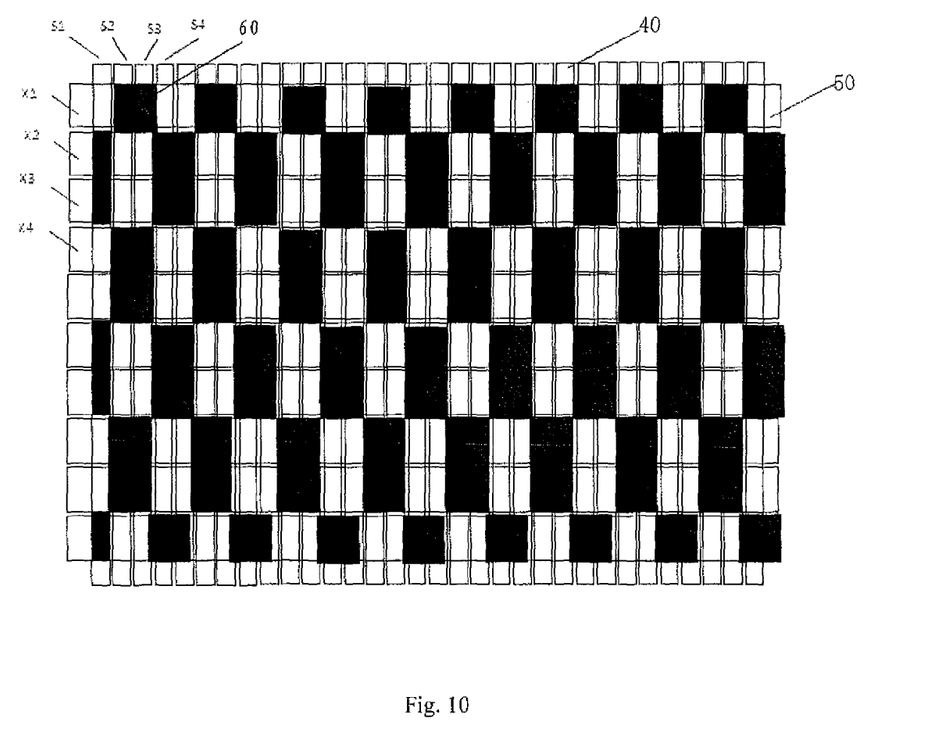
FIG. 10 is a schematic view showing the structural relationship between the electrodes and the light-shielding region of the formed grating when the 3D image is viewed in the landscape orientation according to one embodiment of the present disclosure.

FIG. 9 is a schematic view showing the structural relationship between the electrodes and the light-shielding region of the formed grating when the 3D image is viewed in the portrait orientation, and FIG. 10 is a schematic view showing the structural relationship between the electrodes and the light-shielding region of the formed grating when the 3D image is viewed in the landscape orientation.

Based on the structure of the liquid crystal grating and the principle for controlling the liquid crystal layer to form the gratings, the first electrode 40 and the second electrode 50 receive the first driving signal for forming the first grating and the second driving signal for forming the second grating so that, when the voltage difference between a first number of the adjacent first electrodes 40 and a second number of the adjacent second electrodes 50 is greater than a predetermined value, the light-shielding region 60 is formed at a region where the first number of the adjacent first electrodes 40 and the second number of the adjacent second electrodes 50 are directly opposite to each other and cross each other, and when the voltage difference between the first number of the adjacent first electrodes 40 and the second number of the adjacent second electrodes 50 is less than the predetermined value via a first driving signal and a second driving signal, the light-transmitting region is formed at a region where the first number of the adjacent first electrodes 40 and the second number of the adjacent second electrodes 50 are directly opposite to each other and cross each other.

In the embodiments of the present disclosure, when the aperture ratios of the first grating and the second grating are both 50%, the light-shielding region is of a size equal to the light-transmitting region, the light-shielding region of the first grating is of a size equal to the light-shielding region of the second grating, and the light-transmitting region of the first grating is of a size equal to the light-transmitting region of the second grating.

In addition, referring to FIGS. 9 and 10, in the embodiments of the present disclosure, the light-transmitting region is formed at a region where two of the first electrodes 40 and two of the second electrodes 50 are directly opposite to each other and cross each other. Because the light-shielding region 60 is of a size equal to the light-transmitting region, the light-shielding region 60 is formed at a region where the two of the first electrodes 40 and other two of the second electrodes 50 or other two of the first electrodes 40 and the two of the second electrodes 50 are directly opposite to each other and cross each other. When the adjacent two first electrodes 40 are spaced apart from each other at a first interval and the adjacent two second electrodes 50 are spaced apart from each other at a second interval, a width of the light-shielding region 60 in a horizontal direction (the second extension direction) is equal to a sum of widths of two first electrodes 40 and two first intervals, and a width of the light-shielding region 60 in a vertical direction (the first extension direction) is equal to a sum of widths of two second electrodes 50 and two second intervals.

Alternatively, the first interval and the second interval are each of a minimum value available in an existing etching process, e.g., 3 µm. Of course, the etching precision will gradually increase along with the progress of the etching process, so the value of the first interval and the second interval will be reduced gradually.

In addition, FIGS. 5 and 7 show the structural relationship between the liquid crystal grating and the pixel unit of the display panel. Alternatively, a sum of the first interval and a width of the first electrode 40 is one half of a width of the subpixel unit of the display panel in the horizontal direction (the second extension direction), and a sum of the second interval and a width of the second electrode 50 is one half of a width of the subpixel unit of the display panel in the vertical direction (the first extension direction). Hence, a size of the first electrode 40 is related to the width of the pixel unit in the horizontal direction and the number of the first electrodes 40 in one pixel unit in the horizontal direction, and a size of the second electrode 50 is related to the width of the pixel unit in the vertical direction and the number of the second electrodes 50 in one pixel unit in the vertical direction. When the structure of the pixel unit and/or the number of the electrodes are changed, the first electrode 40 and the second electrode 50 are of different sizes.

It should be appreciated that, the number of the first electrodes or the second electrodes corresponding to the light-transmitting region or the light-shielding region is not limited to two, i.e., there may be one or more than two first or second electrodes corresponding to the light-transmitting region or the light-shielding region.

Based on the above structure of the liquid crystal grating, in the embodiments of the present disclosure, the first driving signal is inputted so as to form the first grating for the 3D display in the portrait orientation together with the display panel. To be specific, a plurality of first electrode control unit sets is arranged sequentially on the first substrate, and each first electrode control unit set includes four adjacent first electrodes S1, S2, S3 and S4. A plurality of second electrode control unit sets is arranged sequentially on the second substrate, and each second electrode control unit set includes four adjacent second electrodes X1, X2, X3 and X4.

As shown in FIG. 9, in accordance with the first driving signal, in the first electrode control unit set, a first one S1 and a second one S2 of the first electrodes receive a first voltage, a third one S3 and a fourth one S4 of the first electrodes receive a second voltage, and in the second electrode control unit set, a first one X1 and a second one X2 of the second electrodes receive the first voltage, and the third one X3 and the fourth one X4 of the second electrodes receive the second voltage.

In this way, at a region the first electrodes 40 and the second electrodes 50 are directly opposite to each other and cross each other, there is no voltage difference between the first electrodes S1/S2 and the second electrodes X1/X2, so the light-transmitting region is formed at this region. There is a voltage difference between the first electrodes S3/S4 and the second electrodes X1/X2, and when a difference between the first voltage and the second voltage is greater than the predetermined value, the light-shielding region 60 is formed at the region where the first electrodes S3/S4 and the second electrodes X1/X2 are directly opposite to each other and cross each other.

Identically, there is a voltage difference between the first electrodes S1/S2 and the second electrodes X3/X4, so the light-shielding region 60 is formed at the region where the first electrodes S1/S2 and the second electrodes X3/X4 are directly opposite to each other and cross each other. There is no voltage difference between the first electrodes S3/S4 and the second electrodes X3/X4, so the light-transmitting region is formed at the region where the first electrodes S3/S4 and the second electrodes X3/X4 are directly opposite to each other and cross each other.

Based on the above, a plurality of first electrode control unit sets and a plurality of second electrode control unit sets are formed, and each of the first or second electrode control unit set includes four first electrodes 40 or four second electrodes 50. From left to right, through the first driving signal, the first voltage is applied to the first electrodes S1 and S2 in the first electrode control unit set, and the second voltage is applied to the first electrodes S3 and S4 in the first electrode control unit set. From up to down, the first voltage is applied to the second electrodes X1 and X2, and the second voltage is applied to the second electrodes X3 and X4. As a result, it is able to form the first grating as shown in FIG. 9 where the light-shielding regions and the light-transmitting regions are arranged alternately.

As shown in FIG. 10, in accordance with the second driving signal, in the first electrode control unit set, the second one S2 and the third one S3 of the first electrodes 40 receive the first voltage, the first one S1 and the fourth one S4 of the first electrodes 40 receive the second voltage, and in the second electrode control unit set, the second one X2 and the third one X3 of the second electrodes 50 receive the first voltage, and the first one X1 and the fourth one X4 of the second electrodes 50 receive the second voltage.

In this way, at the region the first electrodes 40 and the second electrodes 50 are directly opposite to each other and cross each other, there is no voltage difference between the first electrodes S2/S3 and the second electrodes X2/X3, so the light-transmitting region is formed at this region. There is a voltage difference between the first electrodes S2/S3 and the second electrodes X1/X4, so the light-shielding region 60 is formed at this region. There is a voltage difference between the first electrodes S1/S4 and the second electrodes X2/X3, so the light-shielding region 60 is formed at this region. There is no voltage difference between the first electrodes S1/S4 and the second electrodes X1/X4, so the light-transmitting region is formed at this region.

Hence, through the second driving signal, from left to right, the second voltage is applied to the first electrodes S1 and S4, and the first voltage is applied to the first electrodes S2 and S3. From up to down, the second voltage is applied to the second electrodes X1 and X4, and the first voltage is applied to the second electrodes X2 and X3. As a result, it is able to form the second grating as shown in FIG. 10 where the light-shielding regions and the light-transmitting regions are arranged alternately.

By comparing FIGS. 9 and 10, the second grating is moved horizontally to the left or right by 50%, and moved vertically up or down by 50%, relative to the first grating. As a result, it is able for the display panel to display the 3D image in both the landscape orientation and the portrait orientation.

Alternatively, in the first driving signal and the second driving signal, a difference between the first voltage and the second voltage is greater than 3V, so as to overdrive the liquid crystal molecules due to the voltage difference between the first electrode 40 and the second electrode 50, thereby to prevent the light leakage due to the interval between the electrodes.

Alternatively, the second voltage is 0V, and the first voltage is greater than 3V.

The present disclosure further provides in one embodiment a display device including a display panel and the above-mentioned liquid crystal grating. Through the liquid crystal grating and the display panel, it is able for the display panel to display a 3D image in both the landscape orientation and the portrait orientation. The display device may any product or member having a display function, such as a mobile phone, a flat-panel PC, a TV, a display, a laptop PC, a digital photo frame and a navigator. The implementation of the display device may refer to the above-mentioned embodiments, and thus will not be repeated herein.

Of course, the liquid crystal grating may further include a voltage driving unit configured to output the first driving signal or the second driving signal to the liquid crystal grating.

When the 3D image is displayed in the landscape orientation or the portrait orientation, the inputting of the first driving signal and the second driving signal may refer to the above-mentioned embodiments, and thus will not be repeated herein.

According to the liquid crystal grating and the display device in the embodiments of the present disclosure, the first electrodes and the second electrodes arranged at both sides of the liquid crystal layer are all bar-like electrodes, so that the slit positions of the liquid crystal grating are adjustable. As a result, it is able to view the 3D image in both the landscape orientation and the portrait orientation.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A liquid crystal grating for 3D display together with a display panel, comprising a first substrate and a second substrate arranged opposite to each other, and a liquid crystal layer arranged between the first substrate and the second substrate, the liquid crystal grating further comprising:
a plurality of first electrodes having a first extension direction and arranged parallel to each other, the first electrodes being arranged on the first substrate; and
a plurality of second electrodes having a second extension direction and arranged parallel to each other, the second electrodes being arranged on the second substrate,
wherein the first electrodes and the second electrodes cross each other; and
the first electrodes and the second electrodes are configured to enable the liquid crystal layer to form a first grating for the 3D display together with the display panel in a first extension direction, when first voltages are applied to one part of the first electrodes and second voltages are applied to the other part of the first electrodes, and the first voltages are applied to one part of the second electrodes and the second voltages are applied to the other part of the second electrodes in response to a first driving signal; or to enable the liquid crystal layer to form a second grating for the 3D display together with the display panel in a second extension direction, when the first voltages are applied to one part of the first electrodes and the second voltages are applied to the other part of the first electrodes, and the first voltages are applied to one part of the second electrodes and the second voltages are applied to the other part of the second electrodes in response to a second driving signal;
wherein the first voltage is different from the second voltage.

2. The liquid crystal grating according to claim 1, wherein a light-shielding region of the first grating is located at a position corresponding to a boundary between two adjacent subpixel units of the display panel in different colors, and a light-shielding region of the second grating is located at a position corresponding to a boundary between two adjacent subpixel units of the display panel in an identical color.

3. The liquid crystal grating according to claim 1, wherein the first driving signal and the second driving signal are used to, when a voltage difference between a first number of the adjacent first electrodes and a second number of the adjacent second electrodes is greater than a predetermined value, enable the light-shielding region to be formed at a region where the first number of the adjacent first electrodes and the second number of the adjacent second electrodes are directly opposite to each other and cross each other, and when the voltage difference is less than the predetermined value, enable a light-transmitting region to be formed at the region where the first number of the adjacent first electrodes and the second number of the adjacent second electrodes are directly opposite to each other and cross each other.

4. The liquid crystal grating according to claim 3, wherein in the first grating and the second grating, the light-shielding region is of a size equal to the light-transmitting region, and the light-shielding region of the first grating is of a size equal to the light-shielding region of the second grating.

5. The liquid crystal grating according to claim 3, wherein the first number and the second number are each two, the two adjacent first electrodes are spaced apart from each other at a first interval, a sum of the first interval and a width of the first electrode is one half of a width of the subpixel unit of the display panel in the second extension direction, the two adjacent second electrodes are spaced apart from each other at a second interval, and a sum of the second interval and a width of the second electrode is one half of a width of the subpixel unit of the display panel in the first extension direction.

6. The liquid crystal grating according to claim 5, wherein a plurality of first electrode control unit sets is arranged sequentially on the first substrate, each first electrode control unit set comprises four adjacent first electrodes, a plurality of second electrode control unit sets is arranged sequentially on the second substrate, and each second electrode control unit set comprises four adjacent second electrodes.

7. The liquid crystal grating according to claim 6, wherein
in accordance with the first driving signal, in the first electrode control unit set, a first one and a second one of the first electrodes receive the first voltage, a third one and a fourth one of the first electrodes receive the second voltage, and in the second electrode control unit set, a first one and a second one of the second electrodes receive the first voltage, and the third one and the fourth one of the second electrodes receive the second voltage; and
in accordance with the second driving signal, in the first electrode control unit set, the second one and the third one of the first electrodes receive the first voltage, the first one and the fourth one of the first electrodes receive the second voltage, and in the second electrode control unit set, the second one and the third one of the second electrodes receive the first voltage, and the first one and the fourth one of the second electrodes receive the second voltage.

8. The liquid crystal grating according to claim 7, wherein a difference between the first voltage and the second voltage is greater than 3V.

9. The liquid crystal grating according to claim 8, wherein the second voltage is 0V.

10. The liquid crystal grating according to claim 1, wherein the first extension direction is perpendicular to the second extension direction.

11. The liquid crystal grating according to claim 10, wherein the first extension direction is a direction parallel to a first edge of the display panel, and the second extension direction is a direction parallel to a second edge of the display panel.

12. The liquid crystal grating according to claim 1, wherein the first substrate and the second substrate are each a transparent substrate.

13. The liquid crystal grating according to claim 1, wherein the first electrode and the second electrode are bar-like electrodes.

14. A display device, comprising a display panel and a liquid crystal grating for 3D display together with a display panel, the liquid crystal grating comprising a first substrate and a second substrate arranged opposite to each other, and a liquid crystal layer arranged between the first substrate and the second substrate, the liquid crystal grating further comprising:
a plurality of first electrodes having a first extension direction and arranged parallel to each other, the first electrodes being arranged on the first substrate; and
a plurality of second electrodes having a second extension direction and arranged parallel to each other, the second electrodes being arranged on the second substrate,
wherein the first electrodes and the second electrodes cross each other; and
the first electrodes and the second electrodes are configured to enable the liquid crystal layer to form a first grating for the 3D display together with the display panel in a first extension direction, when first voltages are applied to one part of the first electrodes and second voltages are applied to the other part of the first electrodes, and the first voltages are applied to one part of the second electrodes and the second voltages are applied to the other part of the second electrodes in response to a first driving signal; or to enable the liquid crystal layer to form a second grating for the 3D display together with the display panel in a second extension direction, when the first voltages are applied to one part of the first electrodes and the second voltages are applied to the other part of the first electrodes, and the first voltages are applied to one part of the second electrodes and the second voltages are applied to the other part of the second electrodes in response to a second driving signal;
wherein the first voltage is different from the second voltage.

15. The display device according to claim 14, wherein a light-shielding region of the first grating is located at a position corresponding to a boundary between two adjacent subpixel units of the display panel in different colors, and a light-shielding region of the second grating is located at a position corresponding to a boundary between two adjacent subpixel units of the display panel in an identical color.

16. The display device according to claim 14, wherein the first driving signal and the second driving signal are used to, when a voltage difference between a first number of the adjacent first electrodes and a second number of the adjacent second electrodes is greater than a predetermined value, enable the light-shielding region to be formed at a region where the first number of the adjacent first electrodes and the second number of the adjacent second electrodes are directly opposite to each other and cross each other, and when the voltage difference is less than the predetermined value, enable a light-transmitting region to be formed at the region where the first number of the adjacent first electrodes and the second number of the adjacent second electrodes are directly opposite to each other and cross each other.

17. The display device according to claim 16, wherein in the first grating and the second grating, the light-shielding region is of a size equal to the light-transmitting region, and the light-shielding region of the first grating is of a size equal to the light-shielding region of the second grating.

18. The display device according to claim 16, wherein the first number and the second number are each two, the two adjacent first electrodes are spaced apart from each other at a first interval, a sum of the first interval and a width of the first electrode is one half of a width of the subpixel unit of the display panel in the second extension direction, the two adjacent second electrodes are spaced apart from each other at a second interval, and a sum of the second interval and a width of the second electrode is one half of a width of the subpixel unit of the display panel in the first extension direction.

19. The display device according to claim 18, wherein a plurality of first electrode control unit sets is arranged sequentially on the first substrate, each first electrode control unit set comprises four adjacent first electrodes, a plurality of second electrode control unit sets is arranged sequentially on the second substrate, and each second electrode control unit set comprises four adjacent second electrodes.

20. The display device according to claim 19, wherein in accordance with the first driving signal, in the first electrode control unit set, a first one and a second one of the first electrodes receive the first voltage, a third one and a fourth one of the first electrodes receive the second voltage, and in the second electrode control unit set, a first one and a second one of the second electrodes receive the first voltage, and the third one and the fourth one of the second electrodes receive the second voltage; and
in accordance with the second driving signal, in the first electrode control unit set, the second one and the third one of the first electrodes receive the first voltage, the first one and the fourth one of the first electrodes receive the second voltage, and in the second electrode control unit set, the second one and the third one of the second electrodes receive the first voltage, and the first one and the fourth one of the second electrodes receive the second voltage.

\* \* \* \* \*